(12) United States Patent
Kim

(10) Patent No.: US 11,604,091 B1
(45) Date of Patent: Mar. 14, 2023

(54) METHOD FOR AVOIDING NOISE IN AN APPARATUS FOR SPACE MONITORING BY USING SOUND SIGNAL

(71) Applicant: Jae Whan Kim, Seoul (KR)

(72) Inventor: Jae Whan Kim, Seoul (KR)

( * ) Notice: Subject to any disclaimer, the term of this patent is extended or adjusted under 35 U.S.C. 154(b) by 0 days.

(21) Appl. No.: 17/483,525

(22) Filed: Sep. 23, 2021

(51) Int. Cl.
*G01H 17/00* (2006.01)
*H04R 3/00* (2006.01)
*G10K 11/16* (2006.01)
*G01S 15/52* (2006.01)
*G08B 13/16* (2006.01)

(52) U.S. Cl.
CPC ............. *G01H 17/00* (2013.01); *G10K 11/16* (2013.01); *H04R 3/00* (2013.01); *G01S 15/523* (2013.01); *G01S 15/526* (2013.01); *G08B 13/1672* (2013.01)

(58) Field of Classification Search
CPC ........... G01H 17/00; G10K 11/16; H04R 3/00
See application file for complete search history.

(56) References Cited

U.S. PATENT DOCUMENTS

| 11,153,683 | B2 * | 10/2021 | Furuta | H04R 3/12 |
| 2008/0224863 | A1 | 9/2008 | Bachmann | |
| 2011/0141283 | A1 * | 6/2011 | Lee | G08B 13/19695 367/93 |
| 2012/0087211 | A1 * | 4/2012 | Lee | G08B 13/1609 367/93 |
| 2015/0279181 | A1 * | 10/2015 | Park | G08B 13/1672 367/136 |

FOREIGN PATENT DOCUMENTS

| JP | 2010-505153 | 2/2010 |
| KR | 10-2018-0087021 | 8/2018 |
| KR | 10-2048021 | 11/2019 |
| KR | 10-2020-0135709 | 12/2020 |
| KR | 10-2228781 | 3/2021 |

* cited by examiner

Primary Examiner — Andrew L Sniezek

(57) ABSTRACT

Proposed is a noise avoiding method for a space monitoring apparatus using a sound signal and, more specifically, is a technology that allows the space monitoring apparatus, which uses a sound signal to monitor a spatial condition, to avoid noise in a space to be monitored to correctly determine the spatial condition.

9 Claims, 18 Drawing Sheets

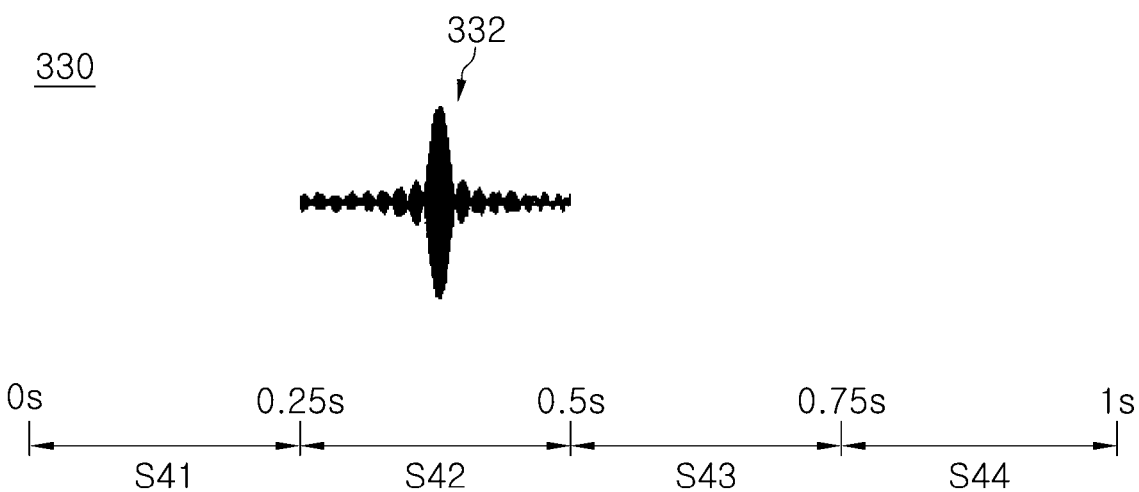

METHOD FOR AVOIDING NOISE IN AN APPARATUS FOR SPACE MONITORING BY USING SOUND SIGNAL

BACKGROUND OF THE INVENTION

Field of the Invention

The present disclosure relates to a noise avoiding method for a space monitoring apparatus using a sound signal and, more specifically, to a technology that allows the space monitoring apparatus, which uses a sound signal to monitor a spatial condition, to correctly determine the spatial condition while avoiding noise in a space to be monitored.

Description of the Related Art

Various detection sensors and devices are being used to detect an intrusion of an outsider into an indoor space, a fire occurrence, a gas leak, and the like. Recently, with the development of IoT technology, a system capable of detecting various conditions, such as whether heating or cooling is applied to an indoor and whether a window is open, from a remote location and taking follow-up actions according to a detection result is being built.

In general, a CCTV, an IR camera, a vibration detection sensor, a gas detection sensor, and the like are applied to these various detection technologies. In the case of the prior art, since individual sensing devices are required for each condition such as intrusion, fire, gas, and the like, a large number of sensing devices are required to monitor various indoor space conditions. Accordingly, costs are incurred to construct a facility and power consumption is also a significant problem.

To solve the above problems, a technique for emitting a sound signal and determining an indoor spatial condition based on a change in the sound signal has been recently proposed.

A sound field sensor (SOFIS) may be applied as one of the technologies for determining a spatial condition based on a sound signal, wherein the sound field sensor is a device that emits sounds (sound signals) of various frequencies and analyzes changes in a sound field formed in a certain space to measure the movement of objects, air flow, changes in temperature, and the like within the certain space.

In recognizing the spatial condition through such a sound field sensor, when noise that is temporarily or continuously generated in the space is mixed and received with a sound signal, there is a problem in that an error occurs in determining the corresponding spatial condition due to the noise.

For example, an error of erroneously determining due to the noise that a specific condition, that has not actually occurred, has occurred in the corresponding space, or an error of not recognizing due to the noise an emergency even in the emergency may be induced.

This recognition error may completely destroy the reliability of a spatial monitoring operation of the sound field sensor. Therefore, for a more correct and reliable spatial condition detection, a method for processing noise is required.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problem occurring in the related art, and the present disclosure is intended to solve a problem in which an error occurs due to noise in determining a corresponding spatial condition when the noise that is temporarily or continuously generated in a space to be monitored is mixed and received with a sound signal.

More specifically, the present disclosure is intended to solve a problem of erroneously determining due to noise that a specific condition that has not actually occurred has occurred in the space, and solve wherein an emergency that has occurred is not recognized due to noise.

The objective of the present disclosure is not limited to the above, and other objects and advantages of the present disclosure not mentioned can be understood by the following description.

An embodiment of a noise avoiding method for a space monitoring apparatus according to the present disclosure may include: a sound signal emitting step of emitting a sound signal to a target space; a sound signal receiving step of receiving a sound signal of the target space; a noise evaluation step of determining a noise section of the received sound signal; and a condition determination section extraction step of extracting a section excluding the noise section from the received sound signal as a condition determination section. In this case, in the sound signal receiving step, an appropriate frequency filter may be used, so that a sound signal corresponding to a frequency of a specific section may be selectively received or sound signals having different frequency bands may be separately received.

As an example, the noise evaluation step may divide the received sound signal into a plurality of determination sections and evaluates noise of each determination section, and the condition determination section extraction step may extract a section determined to have no noise or relatively low noise among the plurality of determination sections as a condition determination section.

As an example, the noise evaluation step may evaluate noise of the received sound signal through comparison between the received sound signal and a predetermined reference signal.

In this case, a method of comparing the received sound signal with the reference signal may compare an envelope of the received sound signal with an envelope of the reference signal to evaluate the noise. Otherwise, the method may transform the received sound signal received on a time domain into a spectrum on a frequency domain through Fourier transform or fast Fourier transform and evaluate the noise based on the spectrum of the received sound signal.

As another embodiment, the noise evaluation step may determine a reception intensity of a frequency component other than a frequency of the emitted sound signal among the received sound signals to estimate the noise of the received sound signal.

As another embodiment, the sound signal emitting step may periodically emit the sound signal, the sound signal receive step may receive the sound signal of the target space in an activation time section in which the sound signal is emitted and a pause time section in which the sound signal is not emitted, and the noise evaluation step may evaluate the noise of the received sound signal of the activation time section based on the sound signal received in the pause time section before and/or after the activation time section.

As a next step of the condition determination section extraction step, the spatial condition of the target space may be determined by using the sound signal received in the extracted condition determination section.

Further, a new condition determination section may be formed by combining the plurality of extracted condition determination sections, and the spatial condition of the target space may be determined by using the sound signal of the newly formed condition determination section.

According to the present disclosure as described above, since a spatial condition of a space to be monitored may be determined by avoiding a noise section from the received sound signal, the correctness and reliability of a spatial monitoring apparatus may be increased.

Furthermore, since various noise evaluation methods, such as envelope analysis, band filtering, and the like are selectively or complexly applied to the received sound signal, the noise section may be precisely avoided in the received sound signal.

Effects of the present disclosure are not limited to those mentioned above, and other effects not mentioned will be clearly understood by those of ordinary skill in the art from the description below.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 8A to 8C illustrate an example of avoiding noise with respect to a received sound signal in which continuous noise exists in the noise avoiding method according to the present disclosure.

DETAILED DESCRIPTION OF THE INVENTION

Figure 1:
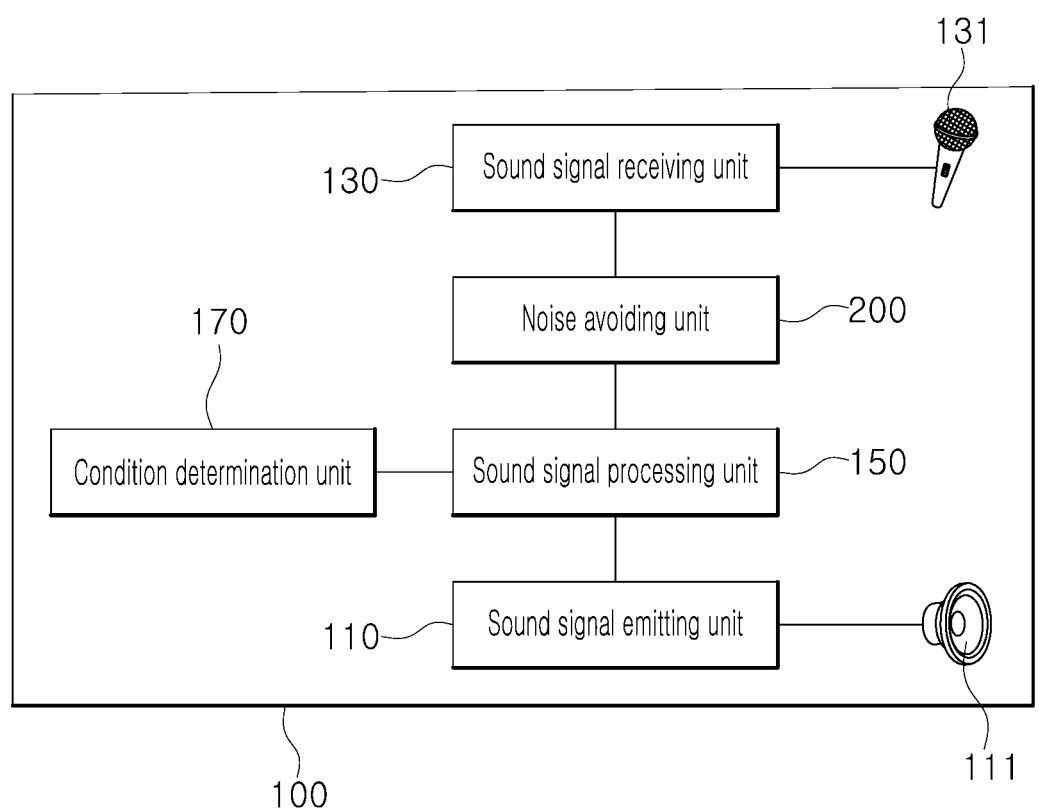
FIG. 1 illustrates a configuration diagram of an embodiment of a space monitoring apparatus to which the present disclosure is applied.

Hereinafter, preferred embodiments of the present disclosure will be described in detail with reference to the accompanying drawings, but the present disclosure is not limited or limited by the embodiments.

In order to explain the present disclosure, the operational advantages of the present disclosure, and the objects achieved by the practice of the present disclosure, preferred embodiments of the present disclosure are exemplified below and will be described with reference to them.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In describing the present disclosure, if it is determined that a detailed description of a related known configuration or function may obscure the gist of the present disclosure, the detailed description thereof will be omitted.

The present disclosure provides a method for monitoring a space to be monitored in a space monitoring apparatus, that may avoid noise of the space to be monitored to correctly determine a spatial condition thereof.

A space monitoring apparatus to which the present disclosure is applied may determine a spatial condition based on a measured frequency response of the space measured by emitting a sound signal to the space to be monitored and receiving a sound signal of the space to be monitored.

The frequency response of the space referred to in the present disclosure may be described as follows. When a target space is regarded as a kind of closed circuit, a sound signal is emitted as an input signal, and a sound signal is received as an output signal, in this case, factors such as sound pressure for each frequency or phase for each frequency of the received sound signal may be defined as 'frequency response of space'.

As an example of expressing such a frequency response of a space, the frequency may be displayed graphically on the horizontal axis and the sound pressure of the received sound as the vertical axis, and a phase element may be displayed on the vertical axis instead of a sound pressure element.

Since the frequency response of a space varies depending on a physical properties of the space, a physical condition of the space may be inferred by using the frequency response of the space, and furthermore, changes in the physical properties of the space may be determined by using a pattern in which the frequency response of the space changes. The change in the physical properties of the space is determined, so that it is possible to determine the spatial condition occurring in the target space.

The space monitoring apparatus may determine the spatial condition based on the frequency response of the space described above and reliability thereof may be lowered due to noise of the space to be monitored. In particular, when a plurality of space monitoring apparatuses are disposed in an adjacent space, a sound signal emitted from one space monitoring apparatus may act as noise to another space monitoring apparatus. As described above, the plurality of space monitoring apparatuses disposed to closely monitor the space to be monitored may cause a problem of lowering monitoring performance.

Therefore, the present disclosure aims to further improve the correctness and reliability of the space monitoring apparatus by proposing a method for determining a spatial condition of a space to be monitored by avoiding noise of the space to be monitored.

FIG. 1 illustrates a configuration diagram of an embodiment of a space monitoring apparatus to which the present disclosure is applied.

The space monitoring apparatus 100 to which the present disclosure is applied may include a sound signal emitting unit 110, a sound signal receiving unit 130, a sound signal processing unit 150, a condition determining unit 170, a noise avoiding unit 200, and the like.

The sound signal emitting unit 110 may include a speaker 111 to emit a sound signal to a target space. The sound signal emitting unit 110 may emit a sound signal of a single sound whose frequency changes with time, may emit a sound signal of a synthesized sound formed of a frequency set including a plurality of frequency components, may emit a sound signal of a synthesized sound formed of a plurality of frequency set whose frequency changes with time, or may emit a sound signal in which a single sound and a synthesized sound are alternated.

Also, the sound signal emitting unit 110 may emit a sound signal through one speaker or a plurality of speakers. When the sound signal is emitted through the plurality of speakers, the same sound signal may be emitted or different sound signals may be emitted.

The sound signal receiving unit 130 may include a microphone 131 to receive the sound signal in the target space. The sound signal receiving unit 130 may receive then sound signal through one microphone or a plurality of microphones.

The sound signal receiving unit 130 may be disposed at the same location as that of the sound signal emitter 110 as a device integrated with the sound signal emitting unit 110 or may be disposed at a different location apart from the sound signal emitting unit 110.

The sound signal processing unit 150 may provide the sound signal to be emitted to the target space to the sound signal emitting unit 110. Also, the sound signal processing unit 150 may measure a frequency response of the space based on the sound signal received by the sound signal receiving unit 130. As an example, the sound signal processing unit 150 may transform the received sound signal into a frequency domain through Fourier transform (FT) or fast Fourier transform (FFT) to measure the frequency response of the space in the frequency domain.

The condition determining unit 170 may determine the condition of the target space based on the frequency response of the space. When various condition changes, such as object movement, temperature change, air movement, and the like, occur in the target space, the received sound signal also changes accordingly and the frequency response of the space measured based on the received sound signal also changes. Therefore, through the analysis of a pattern that the frequency response of the space changes with time, it is possible to determine what kind of condition change has occurred in the space to be monitored. The condition determination unit 170 may determine whether the frequency response of the space changes, the degree of change, a change pattern, and the like to determine a condition change in the space to be monitored.

The noise avoiding unit 200 may receive the received sound signal from the sound signal receiving unit 130 to determine a noise section and may extract a section without noise or a section with relatively little noise from the received sound signal as a condition determination section.

For example, the noise avoiding unit 200 may compare the received sound signal with a predetermined reference signal to determine the noise section in the received sound signal. Here, the reference signal may be set to, for example, a sound signal received in a state in which there is no noise.

In addition, the noise avoiding unit 200 may provide the sound signal processing unit 150 with a condition determination section extracted by avoiding noise from the received sound signal.

As described above, in the present disclosure, since the section without noise or the section with relatively little noise is extracted from the received sound signal through the noise avoiding unit 200 and the spatial condition of the target space is determined based on this, the correctness and reliability of the space monitoring apparatus may be increased.

Figure 2:
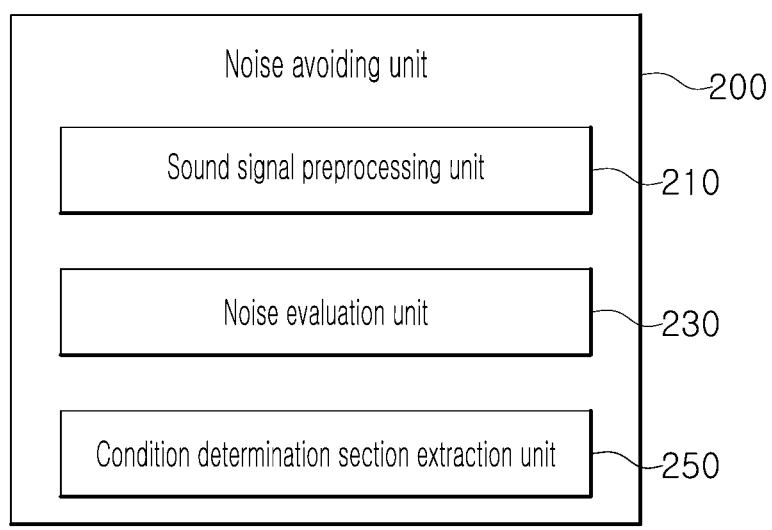
FIG. 2 is a block diagram of an embodiment of a noise avoiding unit in a space monitoring apparatus to which the present disclosure is applied.

In relation to the noise avoiding unit 200, FIG. 2 illustrates a configuration diagram of an embodiment of the noise avoiding unit of the space monitoring apparatus to which the present disclosure is applied.

The noise avoiding unit 200 may include a sound signal preprocessing unit 210, a noise evaluation unit 230, a condition determination section extraction unit 250, and the like.

The sound signal preprocessing unit 210 may receive the received sound signal from the sound signal receiving unit 130 and process the received sound signal to determine the noise section. Preferably, the sound signal preprocessing unit 210 may divide the received sound signal into a plurality of determination sections to determine the noise section in the received sound signal.

As an embodiment, the sound signal preprocessing unit 210 may divide the received sound signal into a plurality of determination sections based on a period of the received sound signal. Otherwise, the sound signal preprocessing unit 210 may divide the received sound signal into a plurality of determination sections based on a preset time unit.

As another embodiment, when the sound signal of the space to be monitored is received in a total time including an activation time section in which the sound signal emitting unit 110 periodically emits the sound signal and the sound signal receiving unit 130 receives the sound signal and a pause time section in which the sound signal is not emitted, the sound signal preprocessing unit 210 may divide a plurality of determination sections while classifying the activation time section in which the sound signal is emitted and the pause time section in which the sound signal is not emitted.

As another embodiment, the sound signal preprocessing unit 210 may classify and divide the received sound signal received on a time domain into a plurality of determination sections and may converts each determination section into a spectrum on a frequency domain through Fourier transform or fast Fourier transform.

The noise evaluation unit 230 may evaluate a noise level of the received sound signal. The noise evaluation unit 230 may search time point where noise is present while scanning the entire received sound signal, but preferably, may evaluate the noise level with respect to the plurality of determination sections obtained by dividing the received sound signal by the sound signal preprocessing unit 210.

The noise evaluation unit 230 may evaluate the noise of the received sound signal based on the reference signal for each of the plurality of determination sections. For example, the reference signal may be set as a sound signal that is emitted from the sound signal emitting unit 110 and is received by the sound signal receiving unit 130 in the absence of noise, and the received sound signal is compared with the reference signal, so that it is possible to evaluate a section in which the noise is included in the received sound signal.

As a method of comparing the received sound signal with the reference signal, noise may be evaluated through envelope analysis of the received sound signal. For example, an envelope for each of the plurality of determination sections may be detected and the shape and size of the detected envelope may be compared with an envelope of the reference signal, so that the noise may be evaluated.

As another embodiment of comparing the received sound signal with the reference signal, for each of the plurality of determination sections, the received sound signal is transformed into a spectrum on a frequency domain through Fourier transform or fast Fourier transform, and the noise may be evaluated on the basis of a spectrum of the received sound signal noise.

For example, when a frequency component other than a frequency component of the emitted sound signal in the spectrum of the received sound signal appears as a sound pressure of a predetermined level or higher, it may be evaluated that noise is present. Otherwise, the noise may be evaluated by comparing a reference spectrum obtained by transforming the reference signal on the frequency domain with the spectrum of a received sound signal.

As another embodiment in which the noise evaluation unit 230 evaluates the noise, the noise may be evaluated by measuring a reception intensity of a frequency component other than a frequency of the emitted sound signal with a frequency filter. For example, in a condition where there is no noise at all, sound should not be received in a frequency region other than a frequency band of the emitted sound signal, so that the sound may be regarded as noise when the sound is received with an intensity above a certain level in the frequency region other than the frequency band of the emitted sound signal.

Such a method starts with the assumption, when noise of a frequency component different from the frequency of the emitted sound signal is measured, that there is a high probability of presence of noise of same frequency of the emitted sound signal, or that there is a high probability of causing errors in the process of determining a condition even when the noise of the same frequency component as the frequency of the emitted sound signal is not included.

At this time, to determine the reception intensity of frequency components other than the emitted sound signal frequency, an appropriate frequency filter may be used to separate and receive the emitted frequency and the other frequencies. Otherwise, after the sound signal received in the time domain is transformed into a frequency domain signal through Fourier transform or fast Fourier transform, the reception intensity of frequencies other than the emitted frequency may be determined.

As another embodiment in which the noise evaluation unit 230 evaluates the noise, when the determination section is divided into an activation time section and a pause time section according to whether a sound signal is emitted or not, the noise evaluation unit 230 may evaluate the noise for the pause time section before and/or after a predetermined activation time section to evaluate the noise for the predetermined activation time section based on an evaluation result. For example, a noise level of the pause time section before or after the predetermined activation time section is measured, so that the noise may be evaluated and the predetermined activation time section may be determined as a noise section when the pause time section is evaluated as the noise section.

The condition determination section extraction unit 250 may extract a section having no noise or a section having relatively little noise from the received sound signal as a condition determination section based on a noise evaluation result of the noise evaluation unit 230.

As an example, when the noise evaluation unit 230 calculates a noise level for each of a plurality of determination sections, the condition determination section extraction unit 250 may extract a determination section having a noise level less than or equal to a reference value as the condition determination section. Otherwise, the condition determination section extraction unit 250 may extract a determination section having the relatively lowest noise level as the condition determination section.

Since such a condition determining unit 170 may determine a change in the condition of the space to be monitored based on the condition determination section that avoids the noise section in the received sound signal by the noise avoiding unit 200, the accuracy and reliability of the space monitoring apparatus 100 may be increased.

The present disclosure proposes a method for monitoring a target space by avoiding a noise section in the space monitoring apparatus 100 as described above. Hereinafter, a method for monitoring a target space through noise avoidance according to the present disclosure will be described with reference to the embodiment of the above-described space monitoring apparatus 100 to which the present disclosure is applied.

Figure 3:
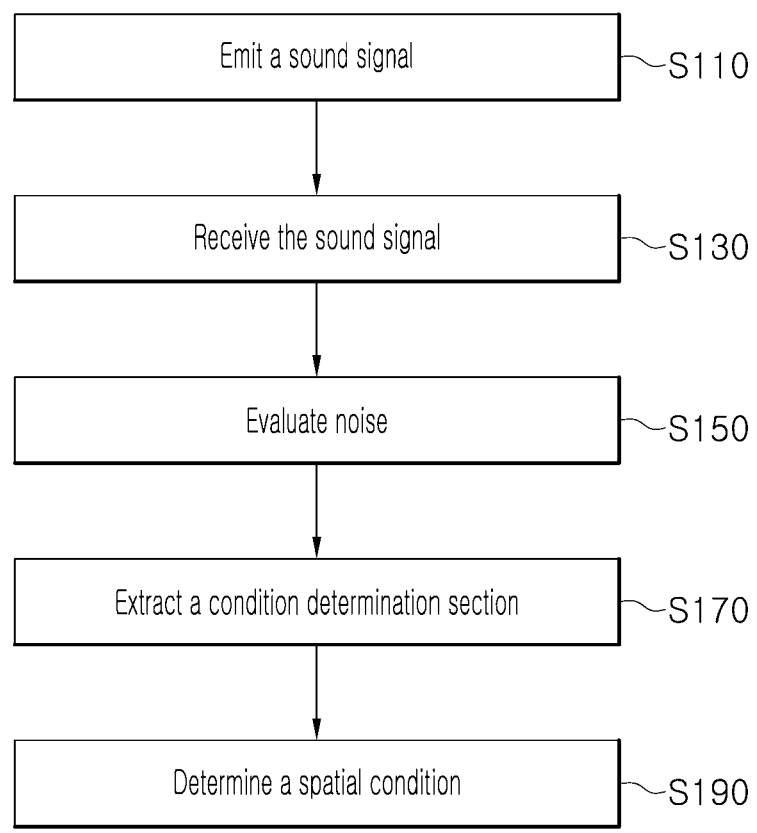
FIG. 3 is a flowchart of an embodiment of a method for monitoring a target space through noise avoidance of a space monitoring apparatus according to the present disclosure.

FIG. 3 is a flowchart illustrating an embodiment of a method for monitoring a target space through noise avoidance of a space monitoring apparatus according to the present disclosure.

The space monitoring apparatus 100 may emit a sound signal to a space to be monitored (S110). Here, the space monitoring apparatus 100 may emit, to the space to be monitored, a sound signal of a single sound whose frequency changes with time, a sound signal of a synthesized sound formed of a frequency set including a plurality of frequency components, a sound signal of a synthesized sound formed of a plurality of frequency set whose frequency changes with time, or emit a sound signal in which a single sound and a synthesized sound are alternated.

The space monitoring apparatus 100 may receive a sound signal of the monitoring target space (S130).

The noise avoiding unit 200 of the space monitoring apparatus 100 may evaluate noise of the received sound signal (S150) and may extract a section without the noise or a section with relatively little noise from the received sound signal as a condition determination section (S170).

The space monitoring apparatus 100 may determine the condition of the space to be monitored based on the condition determination section in which the noise is avoided (S190). The condition determining unit 170 of the space monitoring apparatus 100 may measure a frequency response of the space based on the sound signal of the condition determination section to determine a change in the condition of the space to be monitored.

Figure 4:
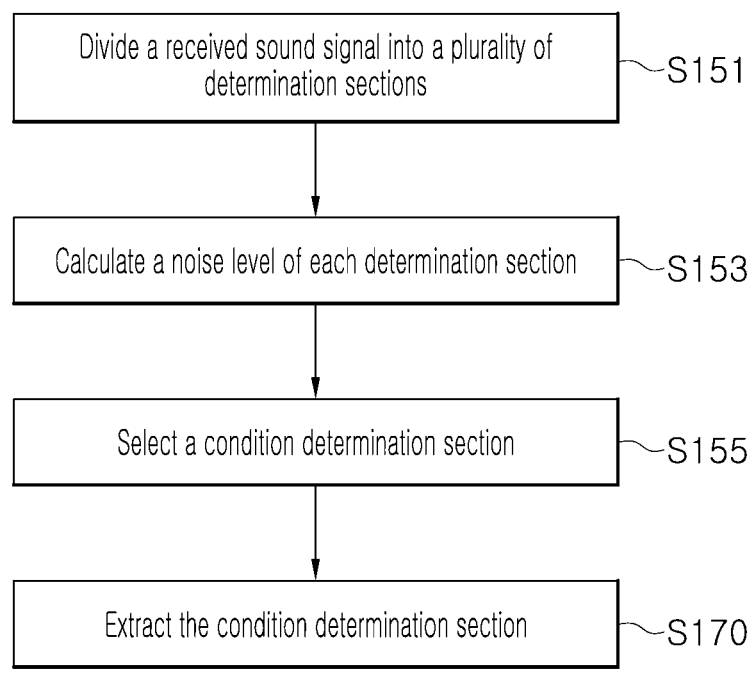
FIG. 4 is a flowchart of an embodiment of a process for avoiding a sound signal containing noise in the present disclosure.

A process in which the noise avoiding unit 200 evaluates the noise of the received sound signal to extract the condition determination section will be described in more detail with reference to the flowchart of the embodiment illustrated in FIG. 4.

The sound signal preprocessing unit 210 of the noise avoiding unit 200 may receive and process the received sound signal from the sound signal receiving unit 130.

The sound signal preprocessing unit 210 may classify the received sound signal into sections to divide the received sound signal into a plurality of determination sections (S151).

In relation to a process in which the sound signal preprocessing unit 210 of the noise avoiding unit 200 divides the received sound signal into the plurality of determination sections, the process will be described with reference to an example of dividing the received sound signal into a plurality of determination sections in the noise avoiding method according to the present disclosure illustrated in FIGS. 5 and 6.

Figure 5A:
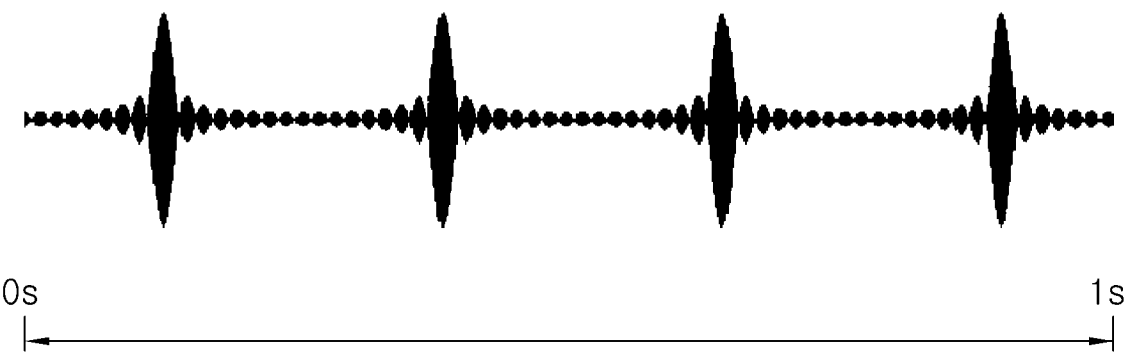
FIGS. 5A to 5E illustrate an example of dividing received sound signal of a synthesized sound into a plurality of determination sections in a noise avoiding method according to the present disclosure.

It is assumed that the received sound signal 310 as illustrated in FIG. 5A is received by emitting a sound signal of a synthesized sound formed of 17 frequencies with a center frequency of 4 KHz and a frequency span of 4 Hz.

Figure 5B:
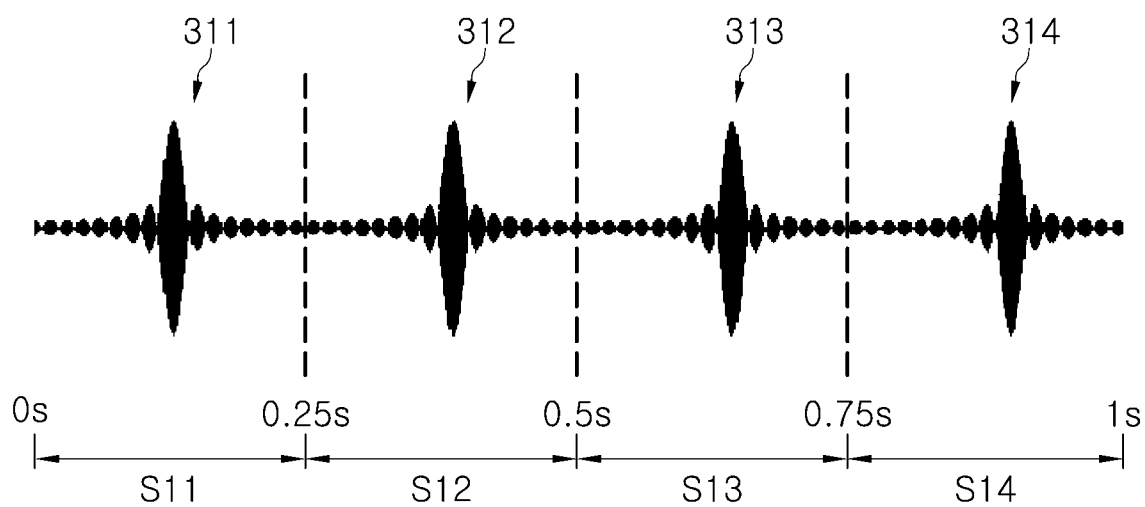

As an embodiment, the sound signal preprocessing unit 210 may divide each section based on a period of the received sound signal into a plurality of determination sections. For example, as illustrated in FIG. 5B, four sections S11 (311), S12 (312), S13 (313), and S14 (314) may be divided as the determination sections by classification by 0.25 second time units based on the period of the received sound signal 310. Division of the received sound signal may be appropriately set as a multiple of the period.

Figure 5C:
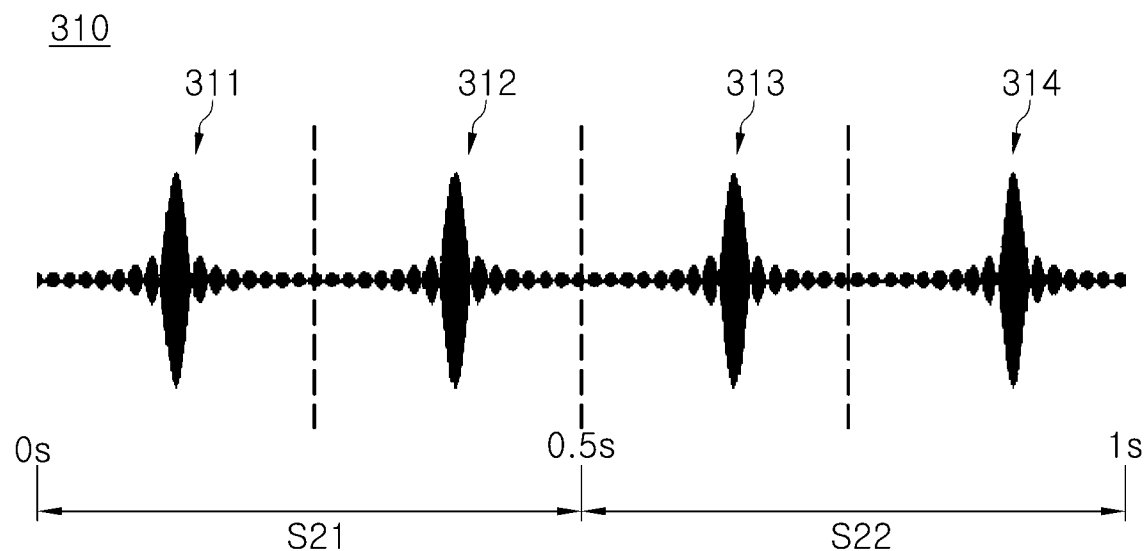

As another embodiment, the sound signal preprocessing unit 210 may divide each section of the received sound signal in a preset time unit into a plurality of determination sections. For example, as illustrated in FIG. 5C, two sections S21 (311, 312) and S22 (313, 314) may be divided into determination sections by classification of the received sound signal 310 by 0.5 second time units.

Figure 5D:
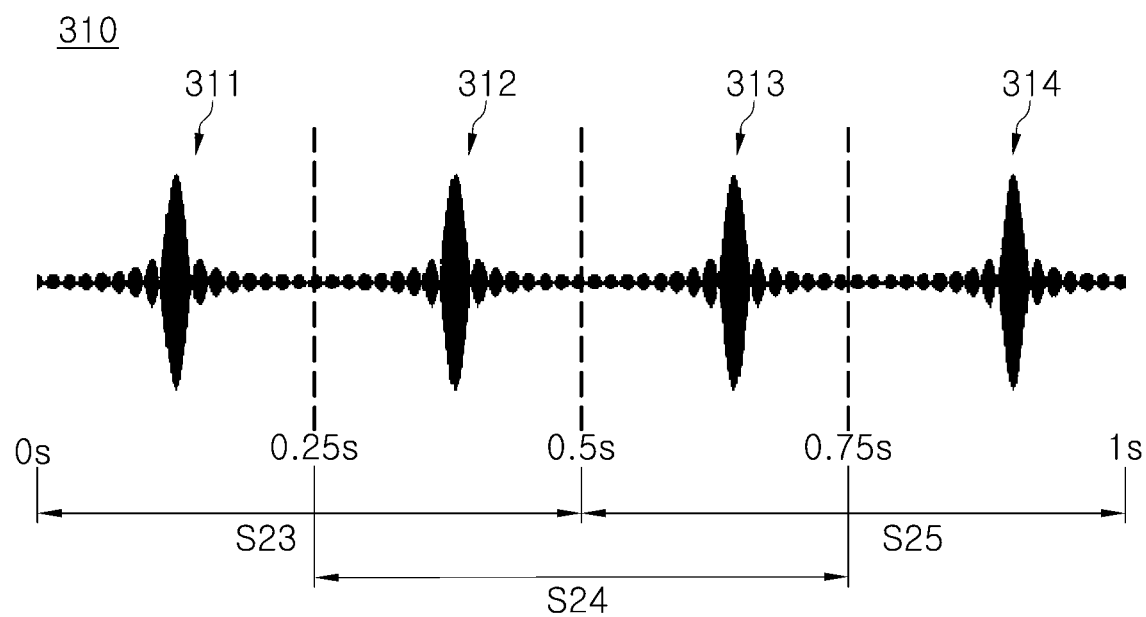
Figure 5E:
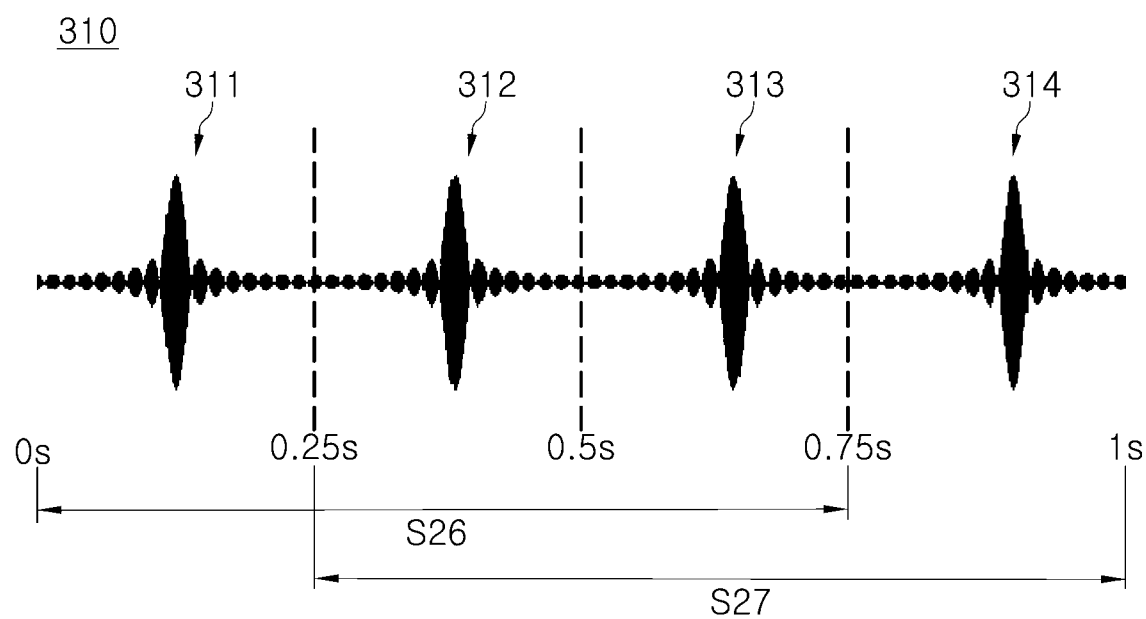

As another embodiment, the sound signal preprocessing unit 210 may divide a plurality of determination sections by classifying a portion of the sound signal into overlapping sections. For example, as illustrated in FIG. 5D, the received sound signal 310 may be divided by 0.5 second time units, wherein some sections are overlapped so that three sections S23 (311, 312), S24 (312, 313), S25 (313, 314) may be divided into the determination sections. In addition, as illustrated in FIG. 5E, the received sound signal 310 is divided by 0.75 second time units, wherein some sections are overlapped so that two sections S26 (311, 312, 313), S27 (312, 313, 314) may be divided as the determination sections.

A time unit for dividing the received sound signal may be appropriately set as necessary.

The sound signal preprocessing unit 210 may classify and divide the received sound signal into a plurality of determination sections and may transform each determination section into a spectrum in a frequency domain through Fourier transform or fast Fourier transform.

Figure 6A:
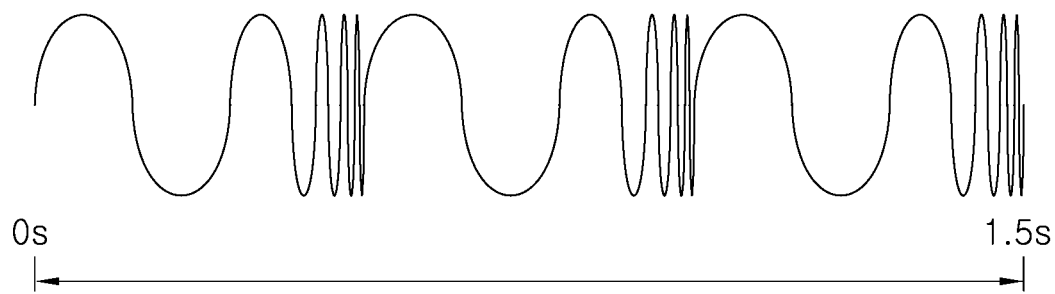
FIGS. 6A to 6C illustrate an example of dividing a received sound signal of a single sound whose frequency varies with time in the noise avoiding method according to the present disclosure into a plurality of determination sections.

Furthermore, it is assumed that the received sound signal 410 is received for 1.5 seconds as illustrated in FIG. 6A by emitting a single sound of a signal sound whose frequency changes with time.

Figure 6B:
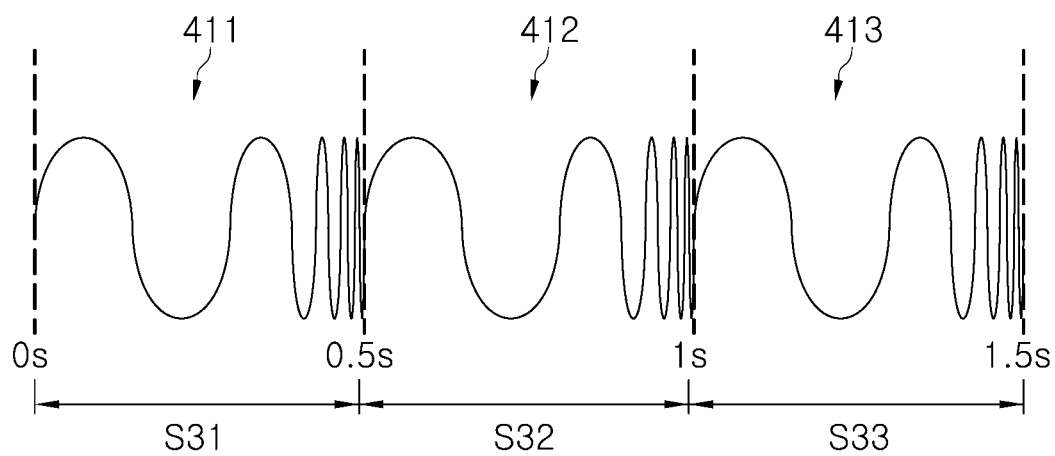

As illustrated in FIG. 6B, the sound signal preprocessing unit 210 may classify the received sound signal by 0.5 second time units based on the period of the sound signal to divide the three sections S31 (411), S32 (412), and S33 (413) as the determination sections.

Figure 6C:
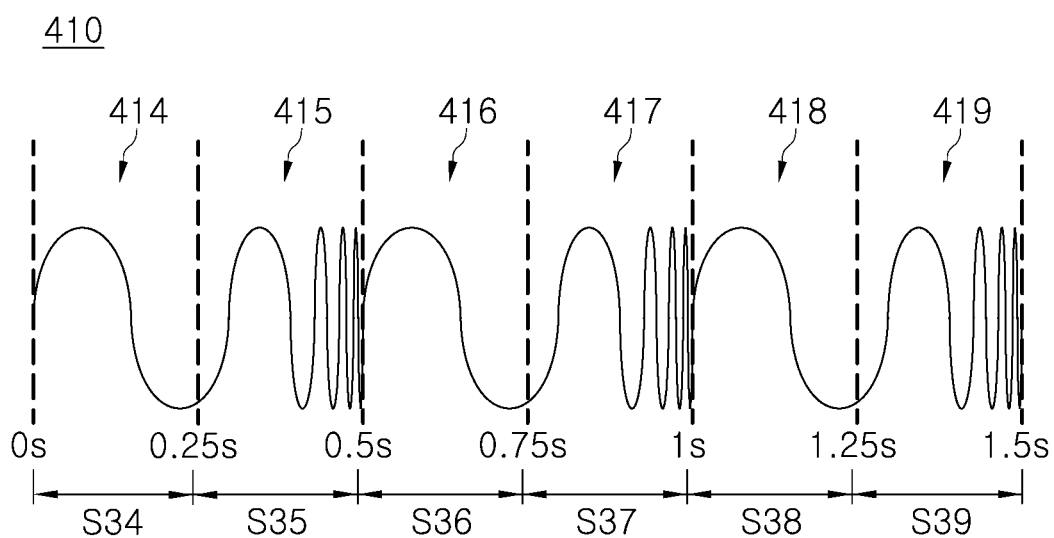

Otherwise, as illustrated in FIG. 6C, the sound signal preprocessing unit 210 may classify the received sound signal by 0.25 second time units irrespective of the period of the sound signal to divide the six sections S34 (414), S35 (415), S36 (416), S37 (417), S38 (418), and S39 (419) as the determination sections.

When the sound signal preprocessing unit 210 processes the received sound signal as necessary and divides it into a plurality of determination sections, the noise evaluation unit 230 of the noise avoiding unit 200 may evaluate the degree of noise for each determination section of the received sound signal to calculate a noise level (S153).

The noise evaluation unit 230 may compare the determination section with a reference signal to calculate the noise level. Here, the reference signal may be set based on the received sound signal received by the sound signal receiving unit 130 for the sound signal emitted from the sound signal emitting unit 110 in the absence of noise.

As an example, FIG. 7 illustrates an example of a reference signal in the noise avoiding method according to the present disclosure.

Figure 7A:
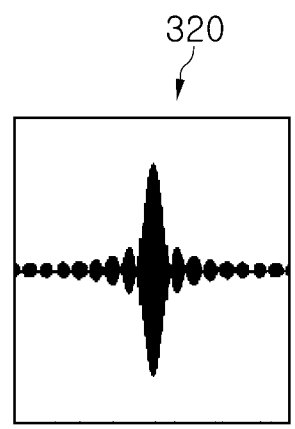
FIGS. 7A and 7B illustrate an example of a reference signal in the noise avoiding method according to the present disclosure.

When the determination section is divided based on the period of the received sound signal as illustrated in FIG. 5B with respect to the received sound signal 510 as illustrated in FIG. 5A, the reference signal 320 as illustrated in FIG. 7A may be set corresponding thereto. The noise estimating unit 230 may compare the reference signal 320 with each determination section to evaluate the noise for each determination section.

Figure 7B:
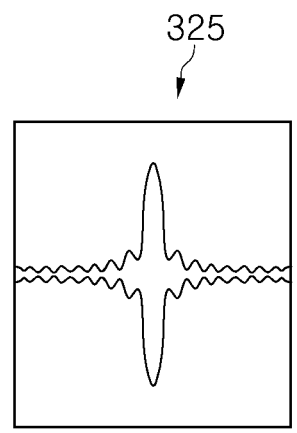

In addition, an envelope for the reference signal as illustrated in FIG. 7B may be extracted and set as a reference envelope 325. The noise evaluation unit 230 may compare the reference envelope 325 with an envelope of each determination section to evaluate the noise for each determination section.

As an example, the noise evaluation unit 230 may compare each determination section with the reference signal 320 or may compare the envelope for each determination section with the reference envelope 325, thereby calculating the noise level according to the magnitude of a difference therebetween.

As an example, when the sound signal preprocessing unit 210 transforms each determination section into a spectrum in the frequency domain, the noise evaluation unit 230 may determine that frequency components other than the frequency component of the sound signal emitted in the spectrum of the received sound signal are represented by a sound pressure of a predetermined level or higher to calculate the noise level, or may compare a reference spectrum obtained by transforming the reference signal in the frequency domain with the spectrum of the received sound signal to calculate the noise level.

The condition determination section extraction unit 250 of the noise avoiding unit 200 may select a section without noise or a section with relatively little noise from the received sound signal based on the evaluation result of the noise evaluation unit 230 (S155) to extract the selected section as a condition determination section (S170).

A process of evaluating noise with respect to a received sound signal to extract a condition determination section will be described with reference to FIGS. 8 to 10.

FIG. 8 illustrates an example of avoiding noise with respect to a received sound signal in which continuous noise exists in the noise avoiding method according to the present disclosure.

Figure 8A:
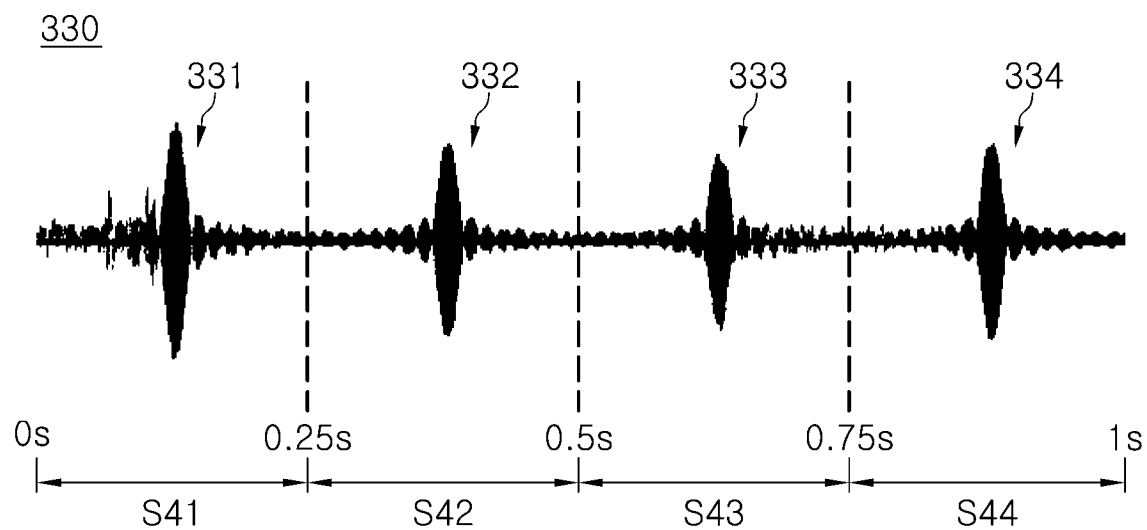

As illustrated in FIG. 8A, the sound signal preprocessing unit 210 may divide the received sound signal 330 received for 1 second into a plurality of determination sections S41 (331), S42 (332), S43 (333), and S44 (334) based on a period of 0.25 seconds.

Figure 8B:
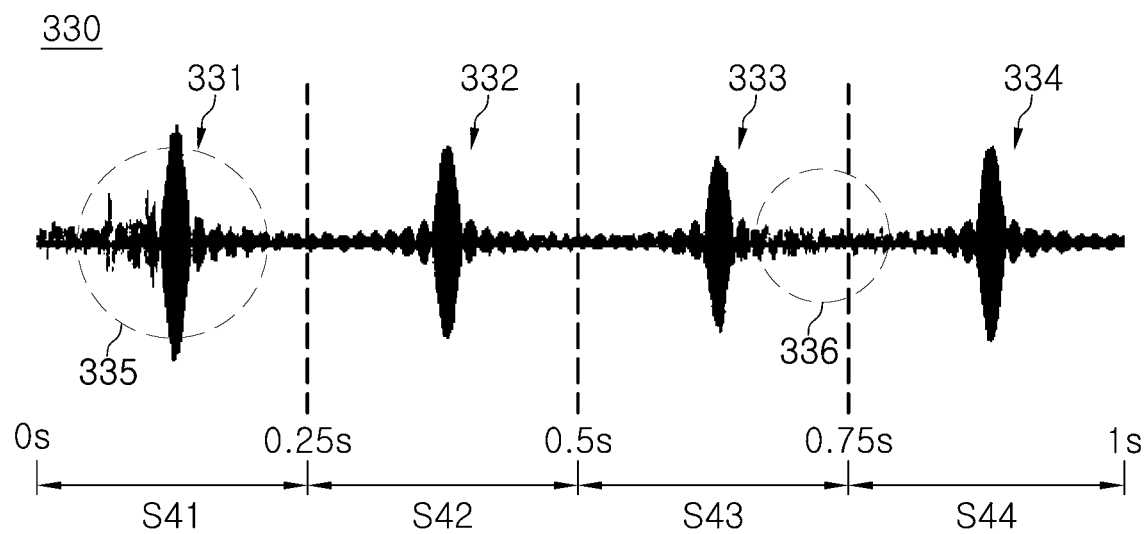

When the noise evaluation unit 230 evaluates the noise based on a reference signal for each of the determination sections S41 (331), S42 (332), S43 (333), and S44 (334), the determination section S41, as illustrated in FIG. 8B, it may be evaluated that a continuous noise 335 is present in S41 (331) and a continuous noise 336 is present in the determination sections S43 (333) and S44 (334).

Here, noise evaluation for each of the determination sections S41 (331), S42 (332), S43 (333), and S44 (334) may use a frequency filter to measure the intensity of a sound received in a frequency domain other than the frequency band of the emitted sound signal to evaluate the noise for each of the determination sections S41 (331), S42 (332), S43 (333), and S44 (334).

Otherwise, the noise for each of the determination sections S41 (331), S42 (332), S43 (333), and S44 (334) may be evaluated by comparing a reference envelope from which an envelope for the reference signal is extracted with an envelope of each of the determination sections S41 (331), S42 (332), S43 (333), and S44 (334).

Otherwise, with respect to each determination section, the received sound signal is expressed a spectrum in the frequency domain through Fourier transform or fast Fourier transform and it is determined whether frequency components other than the frequency component of the sound signal emitted in the spectrum of each determination section represents a sound pressure of a predetermined level or higher, and thus the noise may be evaluated. Alternatively, the noise may be evaluated by comparing a reference spectrum obtained by transforming the reference signal in the frequency domain with a spectrum of each determination section.

Furthermore, with respect to each determination section, the noise may be evaluated by selectively overlapping a plurality of evaluation methods described above.

Based on such an evaluation result of the noise evaluation unit 230, the condition determination section extraction unit 250 may select the determination section S42 (332) without noise or with relatively little noise as the condition determination section.

Moreover, as illustrated in FIG. 8C, the condition determination section extraction unit 250 may extract S42 (332) from the received sound signal 330 as the condition determination section.

As another embodiment, FIG. 9 illustrates an example of avoiding noise with respect to a received sound signal having temporary noise in the noise avoiding method according to the present disclosure.

Figure 9A:
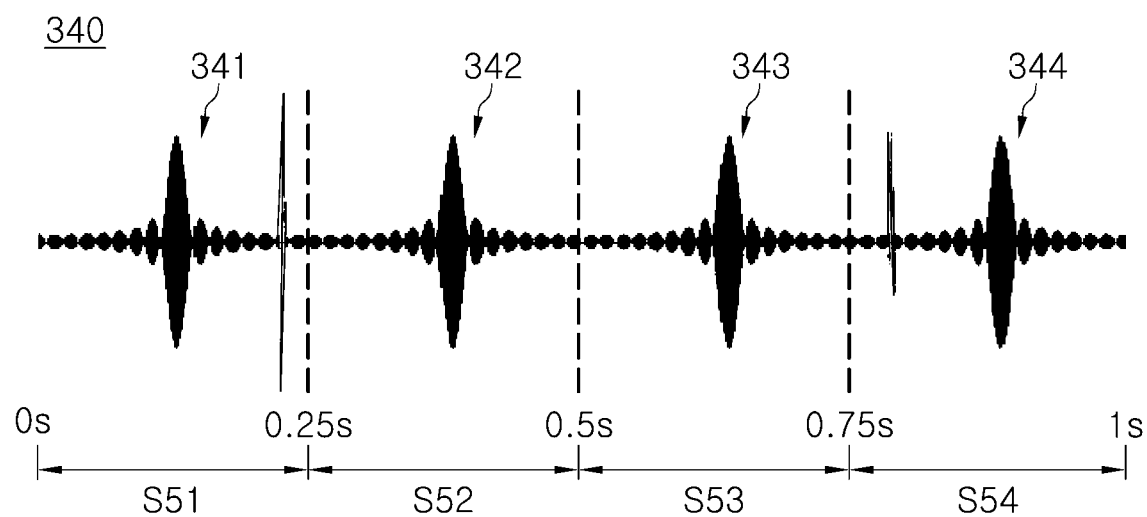
FIGS. 9A to 9C illustrate an example of avoiding noise with respect to a received sound signal having temporary noise in the noise avoiding method according to the present disclosure.

As illustrated in FIG. 9A, the sound signal preprocessing unit 210 may divide the received sound signal 340 received for 1 second into a plurality of determination sections S51 (341), S52 (342), S53 (343), and S54 (344) based on a period of 0.25 seconds.

Figure 9B:
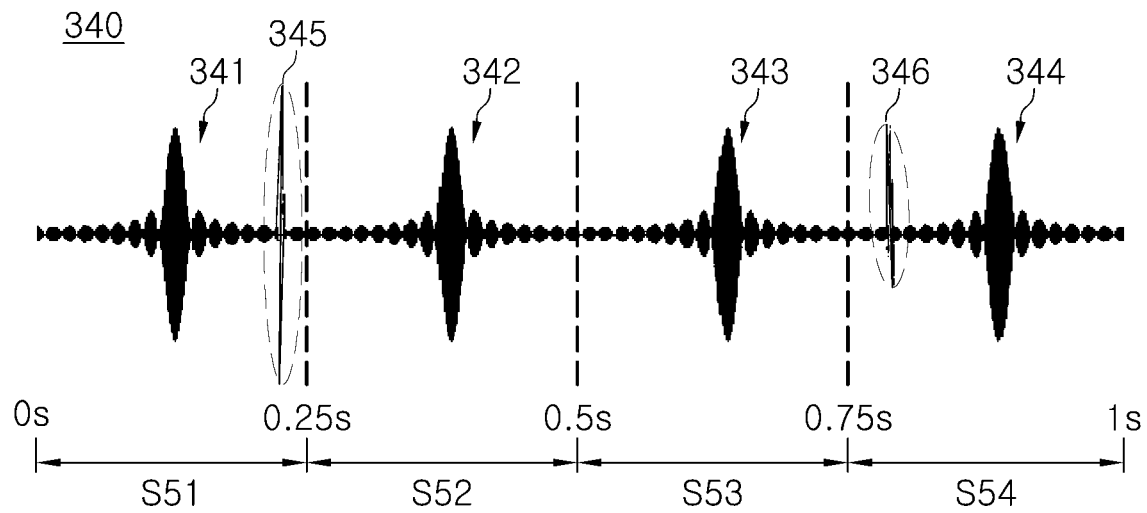

When the noise evaluation unit 230 evaluates the noise in each of the determination sections S51 (341), S52 (342), S53 (343), and S54 (344), as illustrated in FIG. 9B, it may be evaluated that a temporary noise 345 exists in the determination section S51 (341) and a temporary noise 346 exists in the determination section S54 (343).

Here, the method described above with reference to FIG. 8 may be applied to the noise evaluation for each of the determination sections S51 (341), S52 (342), S53 (343), and S54 (344).

Based on such an evaluation result of the noise evaluation unit 230, the condition determination section extraction unit 250 may select the determination sections S52 (342) and S53 (343) with no noise or the relatively least noise as a condition determination section.

Figure 9C:
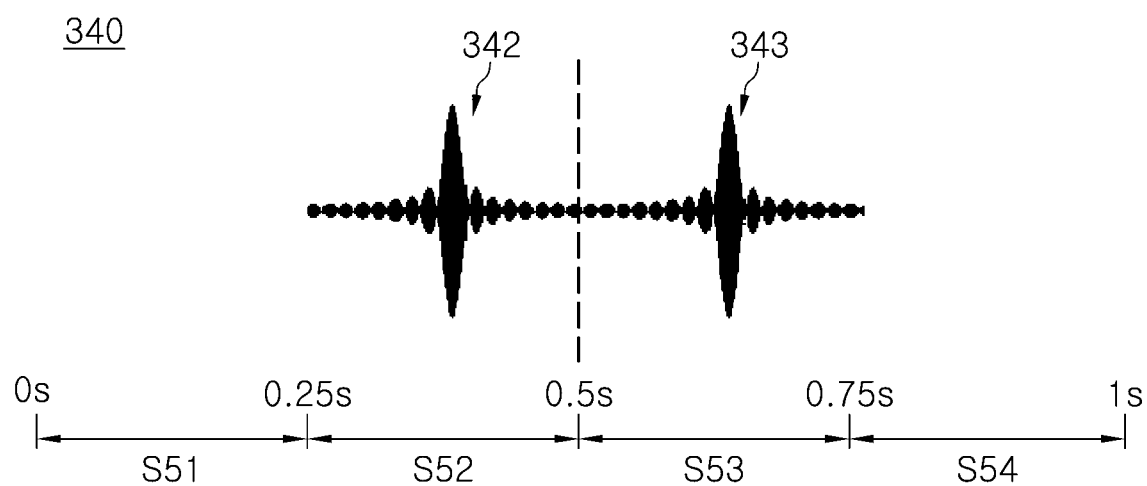

And as illustrated in FIG. 9C, the condition determination section extraction unit 250 may extract either or both of S52 (342) and S53 (343) as the condition determination section from the received sound signal 330.

Furthermore, the noise evaluation unit 230 may extract a plurality of condition determination sections and combine them according to time sequence. That is, it is possible to extract both S52 (342) and S53 (343) as the condition determination section and combine them according to the time sequence.

Since a spatial condition is determined based on a frequency response of a space measured for the plurality of condition determination sections combined according to the time sequence, it is possible to determine a continuous spatial condition change, and through this, it is possible to determine the spatial condition more correctly.

As another embodiment, FIG. 10 illustrates an example of avoiding noise by dividing a received sound signal having an activation time section and a pause time section in the noise avoiding method according to the present disclosure.

Figure 10A:
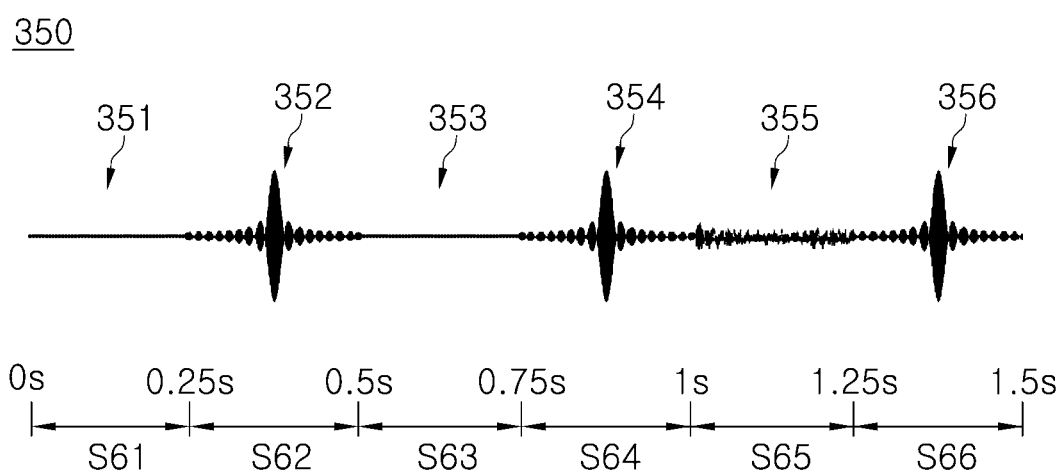
FIGS. 10A and 10B illustrate an example of avoiding noise by dividing a received sound signal having an activation time section and a pause time section in the noise avoiding method according to the present disclosure.

As illustrated in FIG. 10A, when the received sound signal 350 received for 1.5 seconds includes an activation time section and a pause time section, the sound signal preprocessing unit 210 may classify activation time sections S62 (352), S64 (354), and S66 (356), and pause time sections S61 (351), S63 (353), and S65 (355) in consideration of the period of the received sound signal to divide the determination sections.

Figure 10B:
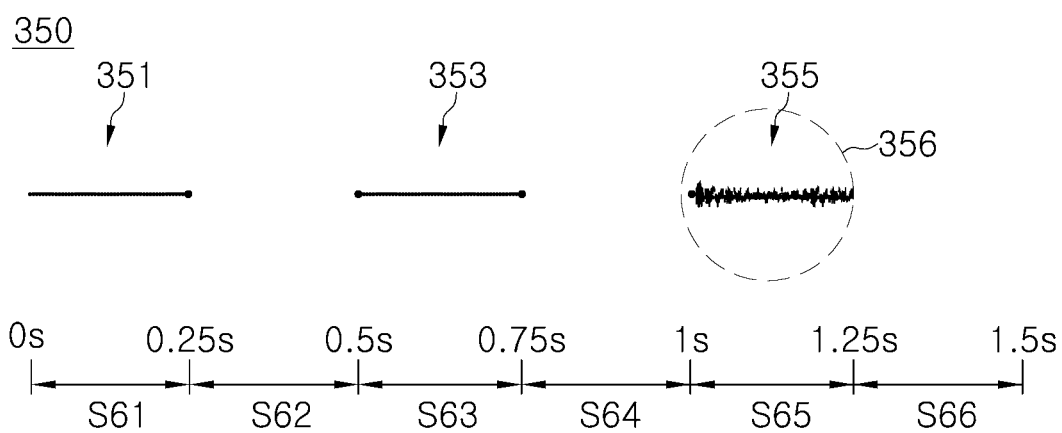

As illustrated in FIG. 10B, the noise evaluation unit 230 may extract the determination sections S61 (351), S63 (353), and S65 (355), which are the pause time sections to evaluate the noise with respect to those. At this time, since the sound signal emitting unit 110 is in the pause time section in which the sound signal is not emitted, if the sound signal is not received or the intensity of the received sound signal is sufficiently small, than it may be evaluated that there is no noise or small noise.

The condition determination section extraction unit 250 may extract a condition determination section based on an evaluation result of the noise evaluation unit 230. When the pause time section before or after the activation time section is evaluated as a noise section, the corresponding activation time section may be evaluated as a noise section. That is, when noise exists in the pause time section before or after the activation time section, it is highly likely that noise also exists in the corresponding activation time section, so that the corresponding activation time section may be regarded as the noise section.

In the case of FIG. 10B, the pause time sections S61 (355) and S63 (353) may be evaluated as having no noise or noise below a predetermined level, but the pause time section S65 (355) may evaluated as having noise 357.

As the pause time section S65 (355) is evaluated as the noise section, the activation time section S64 (354) before the pause time section S65 (355) may be regarded as the noise section and the activation time section S66 (356) after the pause time section S65 (355) may also be regarded as the noise section.

In the activation time section S62 (352), both the previous pause time section S61 (351) and the next pause time section S63 (353) may be evaluated as having no noise or noise below a predetermined level, so the condition determination section extraction unit 250 may select the activation time interval S62 (352) as a condition determination section.

Figure 10C:
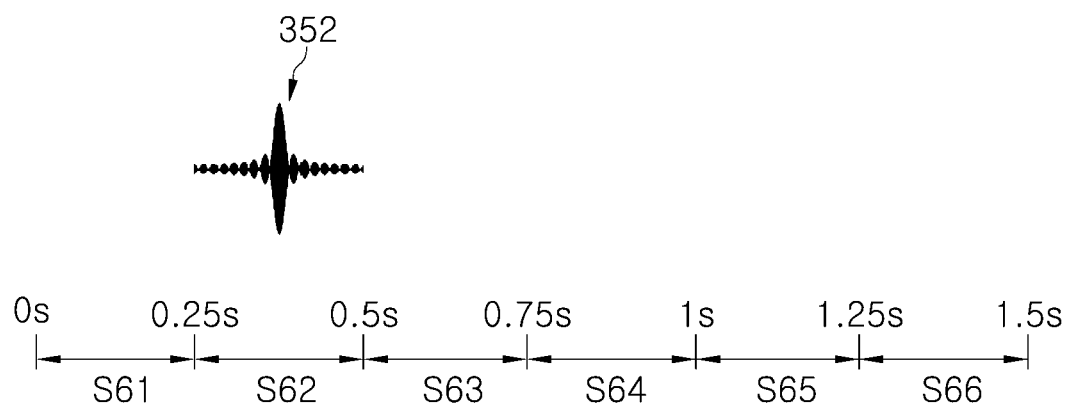

In addition, as illustrated in FIG. 10C, the condition determination section extraction unit 250 may extract S62 (352) as the condition determination section from the received sound signal 350.

FIGS. 8 to 10 have been described with respect to the case in which the emitted sound signal is a synthesized sound. Furthermore, even when the sound signal emitting unit 110 emits a sound signal of a single sound whose frequency changes with time, also a noise section may be evaluated by applying the noise evaluation method of FIGS. 8 to 10.

For example, when the noise is evaluated for the received sound signal 410 of a single sound whose frequency changes with time as illustrated in FIG. 6A, the determination section is classified and divided as illustrated in FIG. 6B or 6C, and each determination section may be evaluated by introducing the noise evaluation method described above. In addition, a determination section having no noise or relatively little may be extracted as a condition determination section.

Furthermore, it is possible to extract a plurality of determination sections with no or relatively little noise through noise evaluation of the plurality of determination sections and combine the extracted determination sections to generate a new condition determination section synthesized by the received sound signal. In this regard, it will be described with reference to FIG. 11.

Figure 11A:
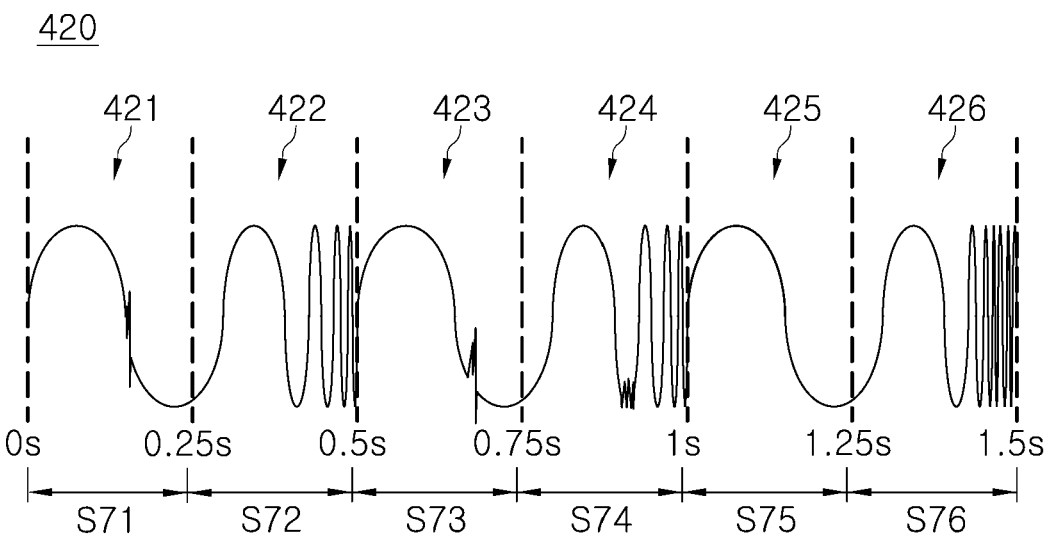
FIGS. 11A to 11C illustrate an example of generating a condition determination section by synthesizing a plurality of determination sections extracted through noise evaluation in the noise avoiding method according to the present disclosure.

When the received sound signal 420 of a single sound whose frequency changes with time is obtained as in FIG. 11A, the received sound signal 420 may be classified and divided into a plurality of determination sections S71 (421) to S76 (426) as described above.

Figure 11B:
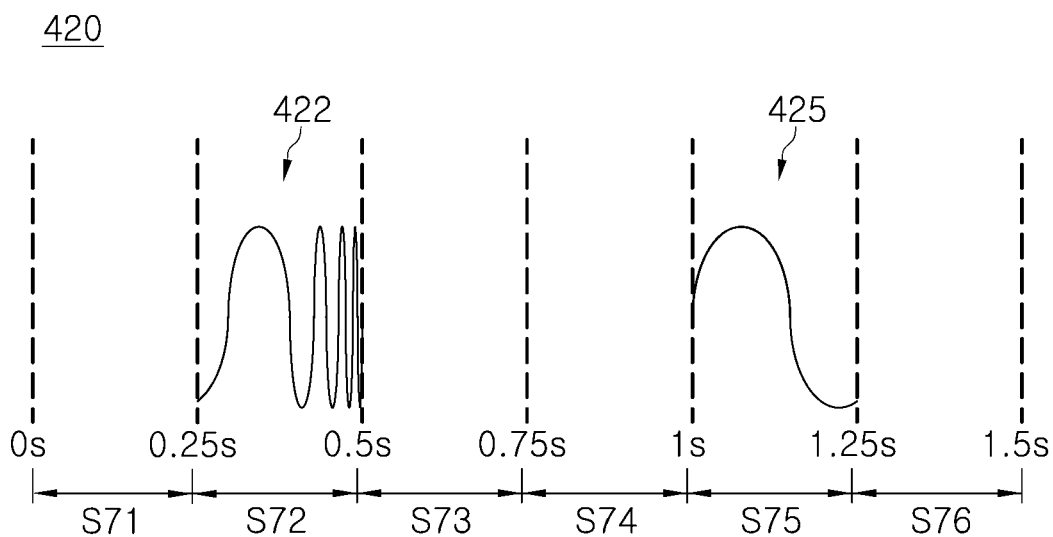

Through the noise evaluation as described above for each of the determination sections S71 (421) to S76 (426), the determination sections S72 (422) and S75 (425) with no noise or relatively little noise as illustrated in FIG. 11B may be extracted.

Figure 11C:
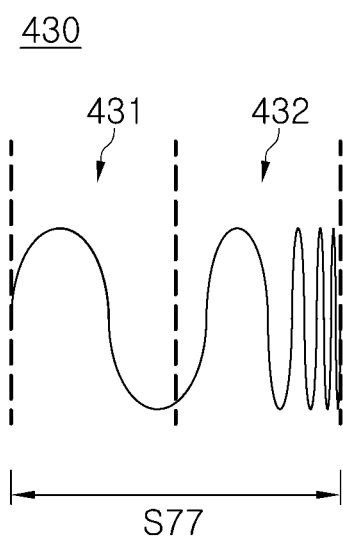

Moreover, since the extracted determination sections S72 (422) and S75 (425) are combined according to the period of the sound signal, it is possible to generate the condition determination sections S77 (431, 432) from the received sound signal 430 as illustrated in FIG. 11C.

As described above, since the new condition determination section is generated by extracting and synthesizing the determination section having no noise or relatively low noise, a sound signal avoiding noise may be obtained efficiently.

On the other hand, in the above, a method of presetting a predetermined interval between determination sections, performing the noise evaluation for each determination section, and selecting some of them as a condition determination section has been exemplified, but it is also possible to scan the received sound signal totally to extract and set a noise-free section having an arbitrary interval as a condition determination section.

As described above, in the present disclosure, since a spatial condition of a space to be monitored may be determined by avoiding noise sections in a received sound signal, the accuracy and reliability of a space monitoring apparatus may be increased.

Furthermore, since various noise evaluation methods, such as envelope analysis, band filtering, and the like, are selectively or complexly applied to the received sound signal, the noise section may be more precisely avoided in the received sound signal.

Although the preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the embodiments described in the present disclosure are not intended to limit the technical spirit of the present disclosure, but to explain, and the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A noise avoiding method for a space monitoring apparatus using a sound signal, the method comprising:
   a sound signal emitting step of emitting a sound signal to a target space;
   a sound signal receiving step of receiving a sound signal of the target space;
   a noise evaluation step of determining a noise section of the received sound signal; and
   a condition determination section extraction step of extracting a section excluding the noise section from the received sound signal as a condition determination section.

2. The method of claim 1, wherein the noise evaluation step divides the received sound signal into a plurality of determination sections and evaluates noise for each determination section, and
   the condition determination section extraction step extracts a section determined to have no noise or relatively low noise among a plurality of determination sections as the condition determination section.

3. The method of claim 2, further comprising:
   a condition determination section combining step of combining the plurality of extracted condition determination sections; and
   a condition determination step of using a sound signal of the combined condition determination section to determine the spatial condition of the target space.

4. The method of claim 1, wherein the noise evaluation step evaluates noise of the received sound signal through comparison between the received sound signal and a predetermined reference signal.

5. The method of claim 4, wherein the noise evaluation step evaluates the noise through comparison between an envelope of the received sound signal and an envelope of the reference signal.

6. The method of claim 1, wherein the noise evaluation step determines a reception intensity of a frequency component other than a frequency of the emitted sound signal to evaluate the noise of the received sound signal.

7. The method of claim 1, wherein the sound signal emitting step periodically emits the sound signal,
   the sound signal receiving step receives the sound signal of the target space in a time section including an activation time section in which the sound signal is emitted and a pause time section in which the sound signal is not emitted, and
   the noise evaluation step evaluates the noise of the received sound signal in the activation time section based on the received sound signal received in the pause time section before and/or after the activation time section.

8. The method of claim 1, wherein the noise evaluation step transforms the received sound signal into a spectrum on a frequency domain and evaluates noise based on the spectrum of the received sound signal.

9. The method of claim 1, further comprising:
a condition determination step of using a sound signal received in the extracted condition determination section to determine a spatial condition of the target space.

* * * * *